United States Patent
Takahata (12)

(10) Patent No.: US 9,583,753 B2
(45) Date of Patent: Feb. 28, 2017

(54) BATTERY

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 263 days.

(21) Appl. No.: 14/366,025

(22) PCT Filed: Dec. 19, 2011

(86) PCT No.: PCT/JP2011/079286
§ 371 (c)(1),
(2), (4) Date: Jun. 17, 2014

(87) PCT Pub. No.: WO2013/093987
PCT Pub. Date: Jun. 27, 2013

(65) Prior Publication Data
US 2014/0335389 A1 Nov. 13, 2014

(51) Int. Cl.
| | |
|---|---|
| *H01M 2/34* | (2006.01) |
| *H01M 10/0525* | (2010.01) |
| *H01M 2/06* | (2006.01) |
| *H01M 2/26* | (2006.01) |
| *H01M 2/30* | (2006.01) |

(52) U.S. Cl.
CPC ......... *H01M 2/345* (2013.01); *H01M 10/0525* (2013.01); *H01M 2/06* (2013.01); *H01M 2/26* (2013.01); *H01M 2/263* (2013.01); *H01M 2/30* (2013.01); *H01M 2200/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,709,968 A | 1/1998 | Shimizu | |
| 2006/0275665 A1* | 12/2006 | Hyung | ............... H01M 2/0285 429/223 |
| 2010/0167116 A1 | 7/2010 | Okada | |

(Continued)

FOREIGN PATENT DOCUMENTS

| | | |
|---|---|---|
| CN | 102468488 A | 5/2012 |
| JP | 9-50822 A | 2/1997 |

(Continued)

*Primary Examiner* — Miriam Stagg
*Assistant Examiner* — Haroon S Sheikh
(74) *Attorney, Agent, or Firm* — Finnegan, Henderson, Farabow, Garrett & Dunner, LLP

(57) ABSTRACT

A battery, which is provided with a pressure-type current interrupt mechanism, is provided with: a gas-generating material placed outside an electrode body and within a battery case; a positive electrode potential member that is placed outside the electrode body and within the battery case in a manner contacting the gas-generating material, and conducts with the positive electrode of the electrode body; and a negative electrode potential member that is placed outside the electrode body and within the battery case in a manner contacting the gas-generating material while being spaced from the positive electrode potential member, and conducts with the negative electrode of the electrode body. The gas-generating material includes a gas-generating agent that generates a gas when the potential of the positive electrode potential member exceeds a gas generation potential.

9 Claims, 9 Drawing Sheets

(56) References Cited

U.S. PATENT DOCUMENTS

| | | |
|---|---|---|
| 2010/0233529 A1 | 9/2010 | Nansaka et al. |
| 2010/0297481 A1 | 11/2010 | Son et al. |
| 2012/0107652 A1* | 5/2012 | Iyori ............... H01M 2/263 |
| | | 429/61 |
| 2013/0067727 A1 | 3/2013 | Nansaka et al. |
| 2013/0067728 A1 | 3/2013 | Nansaka et al. |
| 2013/0189552 A1 | 7/2013 | Okada |

FOREIGN PATENT DOCUMENTS

| | | |
|---|---|---|
| JP | 2010-157451 | 7/2010 |
| JP | 2010-527134 | 8/2010 |
| JP | 2010-212034 | 9/2010 |

\* cited by examiner

BATTERY

CROSS-REFERENCE TO RELATED APPLICATIONS

This application is a national phase application of International Application No. PCT/JP2011/079286, filed Dec. 19, 2011, the content of which is incorporated herein by reference.

TECHNICAL FIELD

The present invention relates to a battery including a pressure-type current interrupt mechanism (CID: Current Interrupt Device) placed in an electrically-conducting path along which charge and discharge currents flow and configured to interrupt the charge and discharge currents flowing through the current interrupt mechanism according to an increase in internal pressure of a battery case.

BACKGROUND ART

Conventionally, there is known a battery including a pressure-type current interrupt mechanism (CID) placed in an electrically-conducting path along which charge and discharge currents flow in order to interrupt the charge and discharge currents flowing through the current interrupt mechanism according to an increase in internal pressure of a battery case. In this battery including the pressure-type current interrupt mechanism, an additive which will generate gas when a positive potential of the battery (an electrode body) exceeds a predetermined gas-generating potential would be added to an electrolyte. Accordingly, when the positive potential of the battery rises, bringing the battery to an overcharge state, and further the positive potential exceeds the predetermined gas-generating potential, the above configuration will generate a gas from the electrolyte to increase the internal pressure of the battery case to thereby operate the pressure-type current interrupt mechanism. For example, such related arts are disclosed in Patent Documents 1 to 3.

RELATED ART DOCUMENTS

Patent Documents

Patent Document 1: JP-T-2010-527134
Patent Document 2: JP-A-2010-212034
Patent Document 3: JP-A-2010-157451

SUMMARY OF INVENTION

Problems to be Solved by the Invention

However, in each battery including the conventional pressure-type current interrupt mechanism, generally, the electrolyte would be retained inside the electrode body and also made contact with positive and negative electrodes inside the electrode body. Thus, gas is generated inside the electrode body. This gas may remain retained in the electrode body without getting out of the electrode body. Therefore, even though the battery is in an overcharge state and the positive potential exceeds the gas-generating potential, the internal pressure of the battery case does not sufficiently increase and the pressure-type current interrupt mechanism does not operate or operates with a delay.

The present invention has been made in view of the above circumstances and has a purpose to provide a battery including a pressure-type current interrupt mechanism and being capable of reliably operating the pressure-type current interrupt mechanism when a positive potential of the battery (an electrode body) exceeds a predetermined gas-generating potential.

Means of Solving the Problems

To achieve the above purpose, one aspect of the invention provides a battery provided with a pressure-type current interrupt mechanism placed in an electrically conducting path in which charge and discharge currents will flow, the current interrupt mechanism being configured to interrupt the charge and discharge currents flowing through the current interrupt mechanism according to an increase in internal pressure of a battery case, the battery including: a gas-generating material placed outside an electrode body within the battery case; a positive potential member placed outside the electrode body within the battery case and in contact with the gas-generating material, the positive potential member being electrically conducted to a positive electrode of the electrode body; and a negative potential member placed outside the electrode body within the battery case and in contact with the gas-generating material and spaced apart from the positive potential member, the negative potential member being electrically conducted to a negative electrode of the electrode body, the gas-generating material containing a gas-generating agent which will generate gas when a potential of the positive potential member exceeds a gas-generating potential.

In this battery, the gas-generating material is placed outside the electrode body within the battery case. The positive potential member which imparts a positive potential of the electrode body to the gas-generating material and a negative potential member which imparts a negative potential of the electrode body to the gas-generating material are spaced apart from each other and placed in contact to the gas-generating material. The gas-generating material contains the gas-generating agent that generates a gas when a potential of the positive potential member (which corresponds to a positive potential of the electrode body) exceeds a predetermined gas-generating potential. Thus, when the positive potential of the electrode body (the potential of the positive potential member) exceeds the predetermined gas-generating potential, the gas-generating material placed outside the electrode body generates a gas. This gas occurs outside the electrode body and therefore will not be retained in the electrode body, reliably allowing the internal pressure of the battery case to increase. In this battery, accordingly, the pressure-type current interrupt mechanism can be reliably operated when the positive potential exceeds the gas-generating potential.

The "gas-generating material" may be provided in any form of a liquid, a solid, a gel, a sponge impregnated with the liquid, etc. The "gas-generating material" is placed outside the electrode body within the battery case. For example, the gas-generating material may be placed in a bottom area, an upper area, or a side area in the accommodating space of the battery case. Furthermore, the "gas-generating material" may be placed in contact with the electrode body or separated from the electrode body as will be described later.

The "gas-generating agent" will generate a gas when a potential of the positive potential member exceeds the gas-generating potential as mentioned above. The gas-generating agent may be selected for example from biphenyl (BP) that generates a hydrogen gas ($H_2$) as the gas at a gas-generating potential of 4.50 V vs. Li/Li$^+$, cyclohexyl benzene (CHB) that generates a hydrogen gas ($H_2$) as the gas at a gas-generating potential of 4.70 V vs. Li/Li$^+$, methylphenyl carbonate (MPhc) that generates carbon dioxide ($CO_2$) as the gas at a gas-generating potential of 4.90 V vs. Li/Li$^+$, and others.

The "positive potential member" and the "negative potential member" may be configured for example in a plate-like form, a rod-like form, a foil-like form, a mesh form, or any combination of those forms. Further, each of the "positive potential member" and the "negative potential member" may be formed in a single member or in a combination of two or more members. The "positive potential member" is electrically conducted to the positive electrode of the electrode body. For this purpose, it may be connected to the positive electrode of the electrode body (direct connection) or indirectly connected to the positive electrode of the electrode body through another conducting member. The "negative potential member" is electrically conducted to the negative electrode of the electrode body. For this purpose, it may be connected to the negative electrode of the electrode body (direct connection) or indirectly connected to the negative electrode of the electrode body through another conducting member.

The "positive potential member", as explained later, may be also used as a positive internal terminal member connected to the positive electrode of the electrode body to allow charge and discharge currents to flow through the positive internal terminal member or may be provided as a separate member independent from the positive internal terminal member and in non-contact with this positive internal terminal member. The "negative potential member", as explained later, may be also used as a negative internal terminal member connected to the negative electrode of the electrode body to allow charge and discharge currents to flow through the negative internal terminal member or may be provided as a separate member independent from the negative internal terminal member and in non-contact with this negative internal terminal member. Furthermore, the "positive potential member" and the "negative potential member" are spaced apart from each other and are placed in contact with the gas-generating material. It may be arranged such that only the gas-generating material is interposed between them or an insulating porous film or the like to be used for the separator of the electrode body may be interposed between them to prevent short circuit.

In the above battery, further preferably, the gas-generating agent has the gas-generating potential higher than a potential of the positive potential member when the battery is in full charge.

In any one of the above batteries, preferably, the gas-generating material is a gas-generating liquid stored in a bottom area of accommodating space in the battery case, the positive potential member includes a positive contact part placed in the bottom area of the accommodating space and immersed in the gas-generating liquid, and the negative potential member includes a negative contact part placed in the bottom area of the accommodating space and immersed in the gas-generating liquid.

In the above battery, further preferably, the electrode body and the gas-generating liquid are spaced apart from each other. In the above battery, preferably, the gas-generating liquid and the electrolyte retained in the electrode body are different in composition.

In any one of the above batteries, preferably, the battery case has a rectangular parallelepiped shape including a case bottom wall portion having a rectangular plate-like shape, the positive contact part includes a positive main surface which is a main surface extending in a longitudinal direction of the case bottom wall portion, the negative contact part includes a negative main surface which is a main surface extending in the longitudinal direction of the case bottom wall portion, and the positive main surface and the negative main surface are placed in parallel to and facing each other through the gas-generating liquid.

In any one of the above batteries, preferably, an electrolyte retained in the electrode body has a composition that contains no gas-generating additive.

In any one of the above batteries, preferably, the positive potential member is connected to the positive electrode of the electrode body and also used as a positive internal terminal member in which the charge and discharge currents flow, and the negative potential member is connected to the negative electrode of the electrode body and also used as a negative internal terminal member in which the charge and discharge currents flow.

Figure 1:
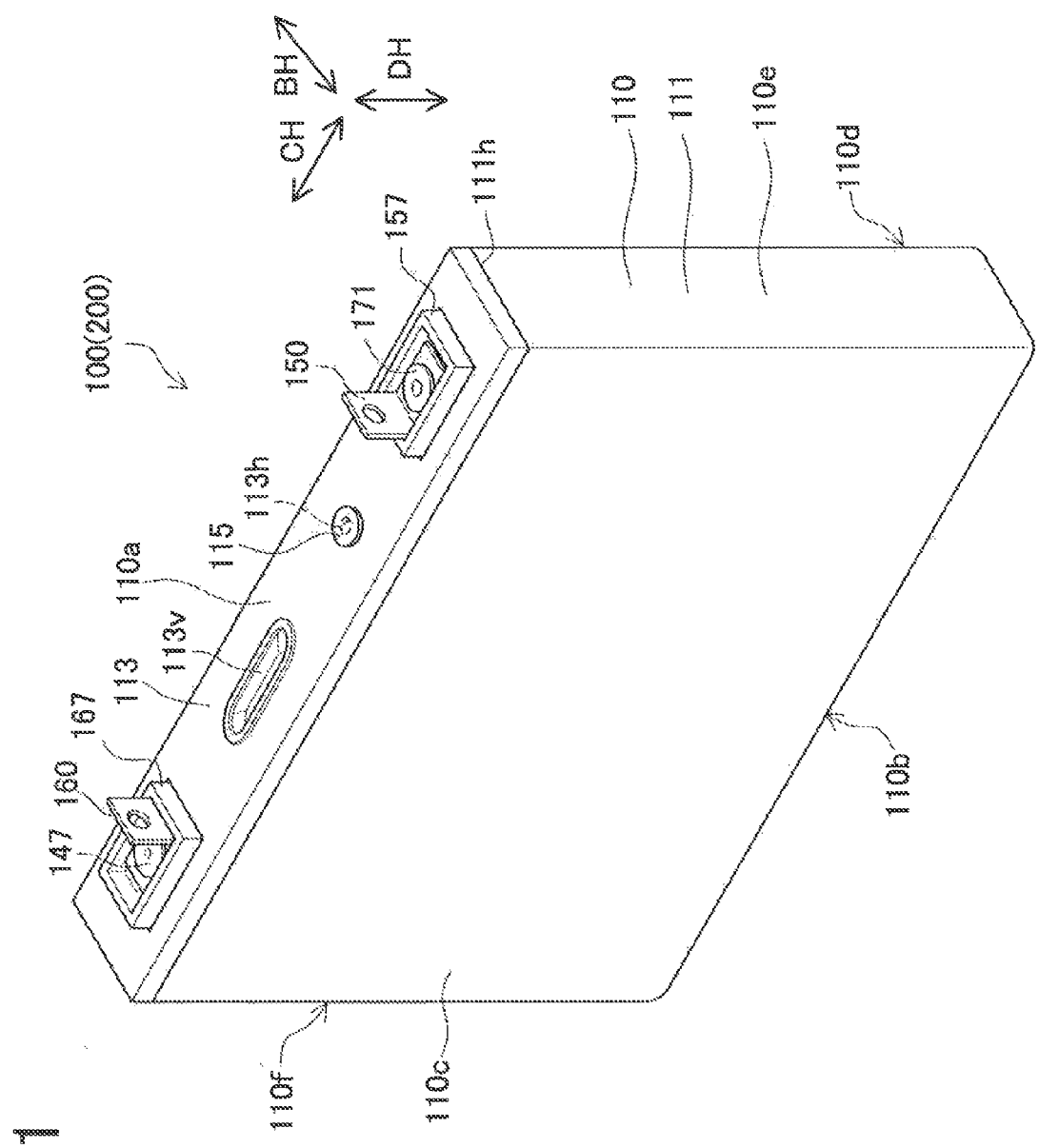
FIG. 1 is a perspective view of a lithium ion secondary battery of a first embodiment.

REFERENCE SIGNS LIST 100, 200 Lithium ion secondary battery (Battery)
110 Battery case
110a Case upper wall portion
110b Case bottom wall portion
110c, 110d, 110e, 110f Case side wall portion
117 Electrolyte
120, 220 Electrode body
121, 221 Positive electrode sheet (Positive electrode)
123, 223 Negative electrode sheet (Negative electrode)
130, 230 Positive internal terminal member (Positive potential member)
131 Positive main part
133, 233 Positive contact part
133c, 233c Positive main surface
133d, 233d Positive back surface
137, 237 Terminal-side connecting part
231 Positive extended part 235 Positive connecting part
140, 240 Negative internal terminal member (Negative potential member)
141 Negative main part
143, 243 Negative contact part
143c, 243c Negative main surface
143d, 243d Negative back surface
147, 247 Negative caulking part
241 Negative extended part
245 Negative connecting part
150 Positive terminal (of Battery) (Positive external terminal member)
160 Negative terminal (of Battery) (Negative external terminal member)
170 Pressure-type current interrupt mechanism
190 Gas-generating liquid (Gas-generating substance)
191 Porous film
700 Hybrid car (Vehicle)
710 Assembled battery
800 Hammer drill (Battery using device)
810 Battery pack
BH Thickness direction
CH Width direction
DH Height direction
SC Accommodating space
SCB Bottom area (of Accommodating space)

MODE FOR CARRYING OUT THE INVENTION

First Embodiment

Figure 2:
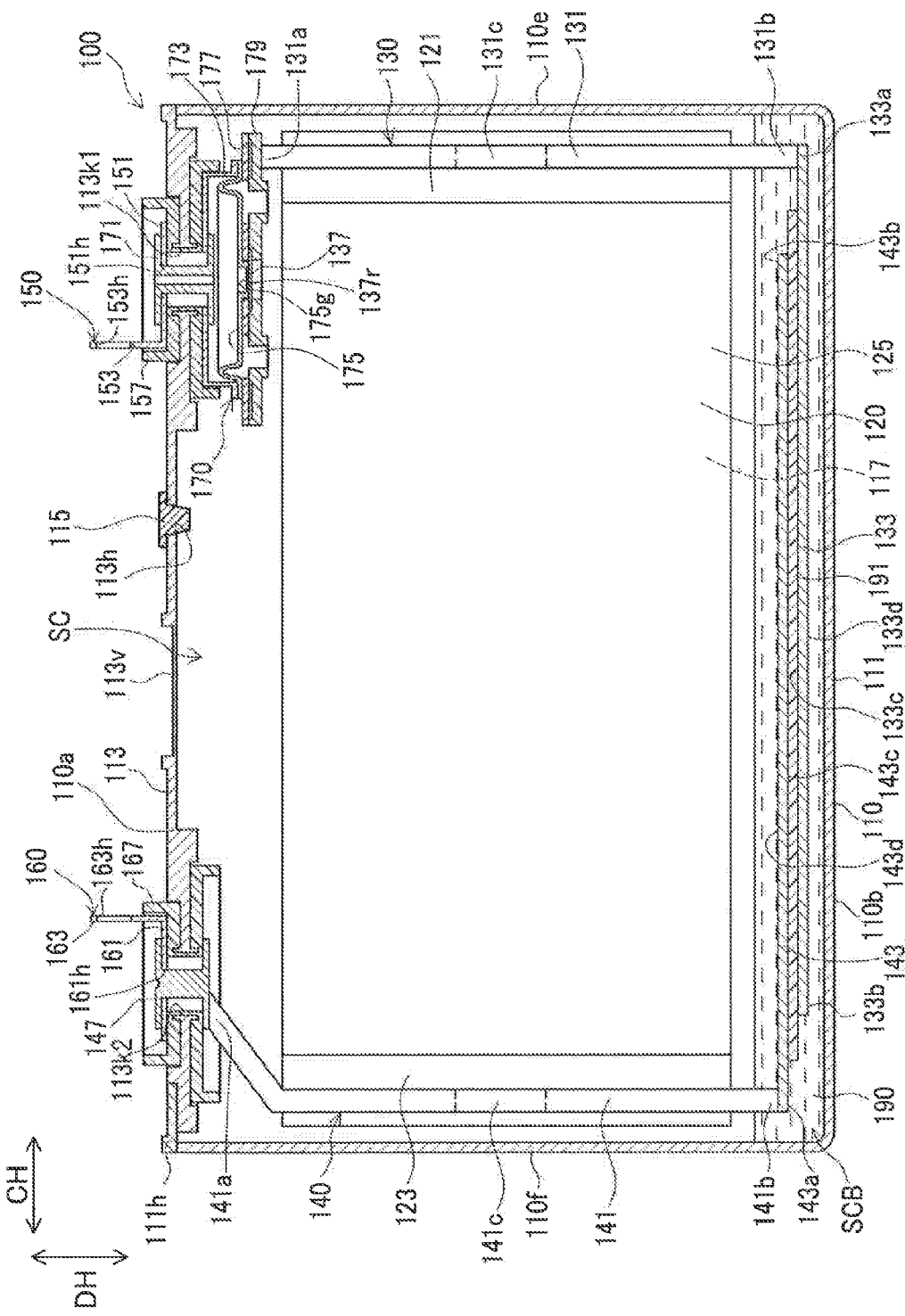
FIG. 2 is a vertical cross sectional view of the lithium ion secondary battery of the first embodiment.
Figure 3:
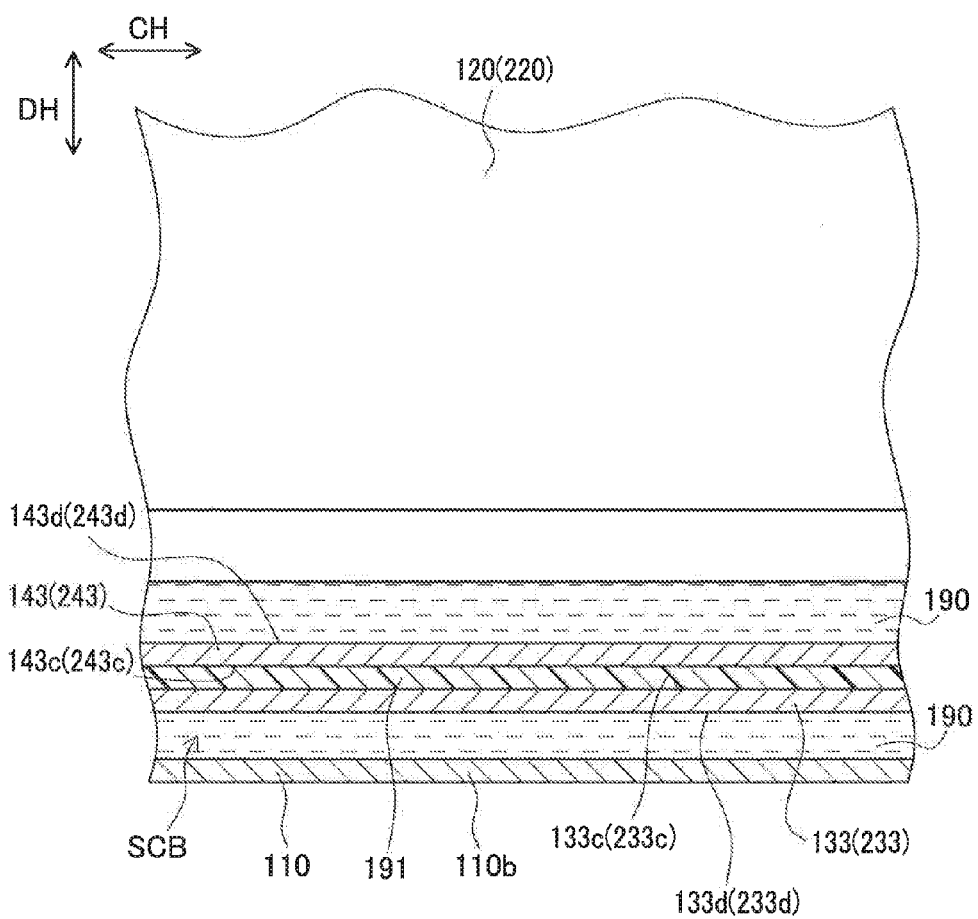
FIG. 3 is an enlarged cross sectional view of a part of a case bottom wall portion and surrounding parts in the lithium ion secondary battery of the first embodiment.
Figure 4:
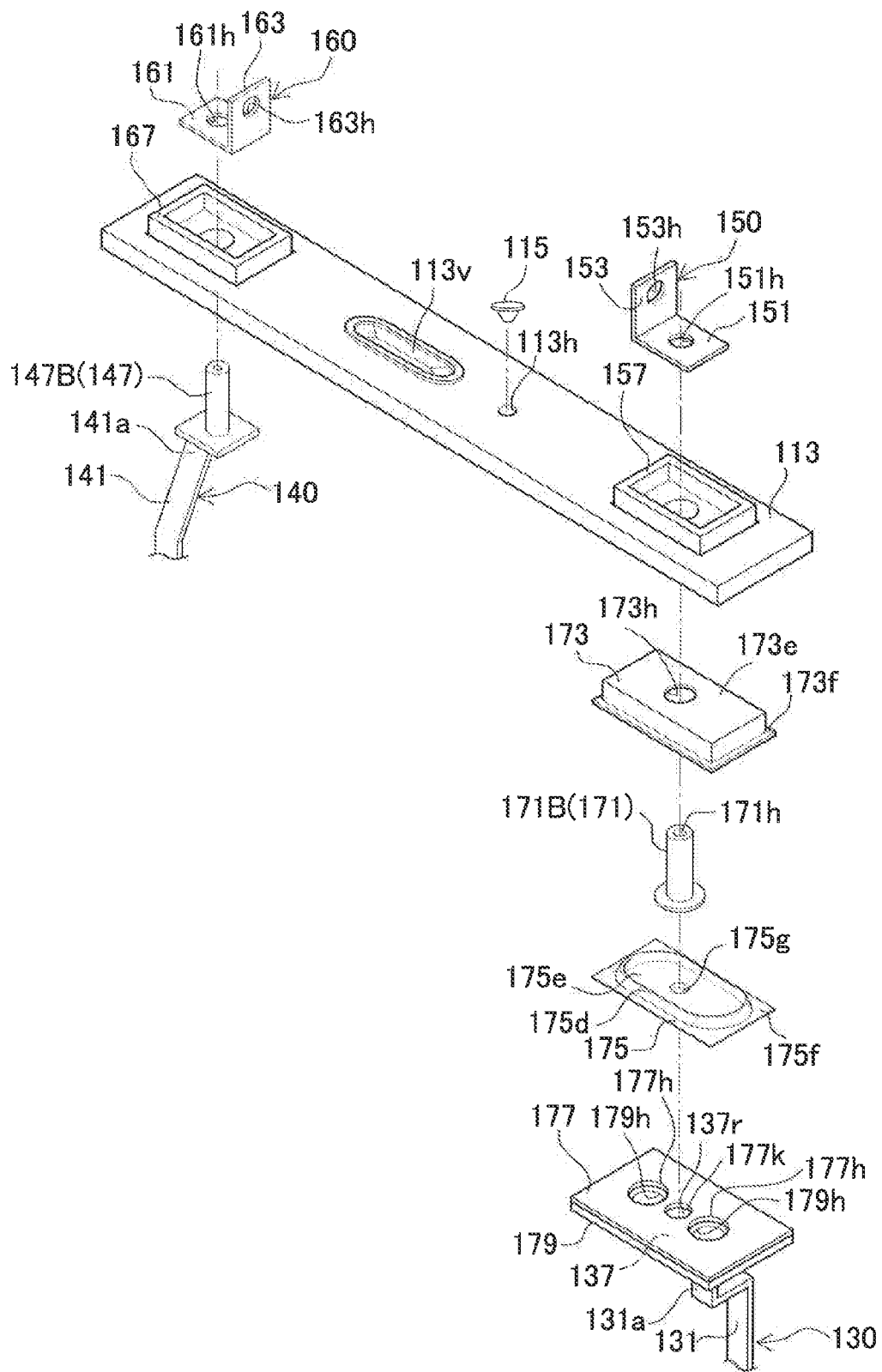
FIG. 4 is an exploded perspective view of an upper part of the lithium ion secondary battery of the first embodiment.
Figure 5:
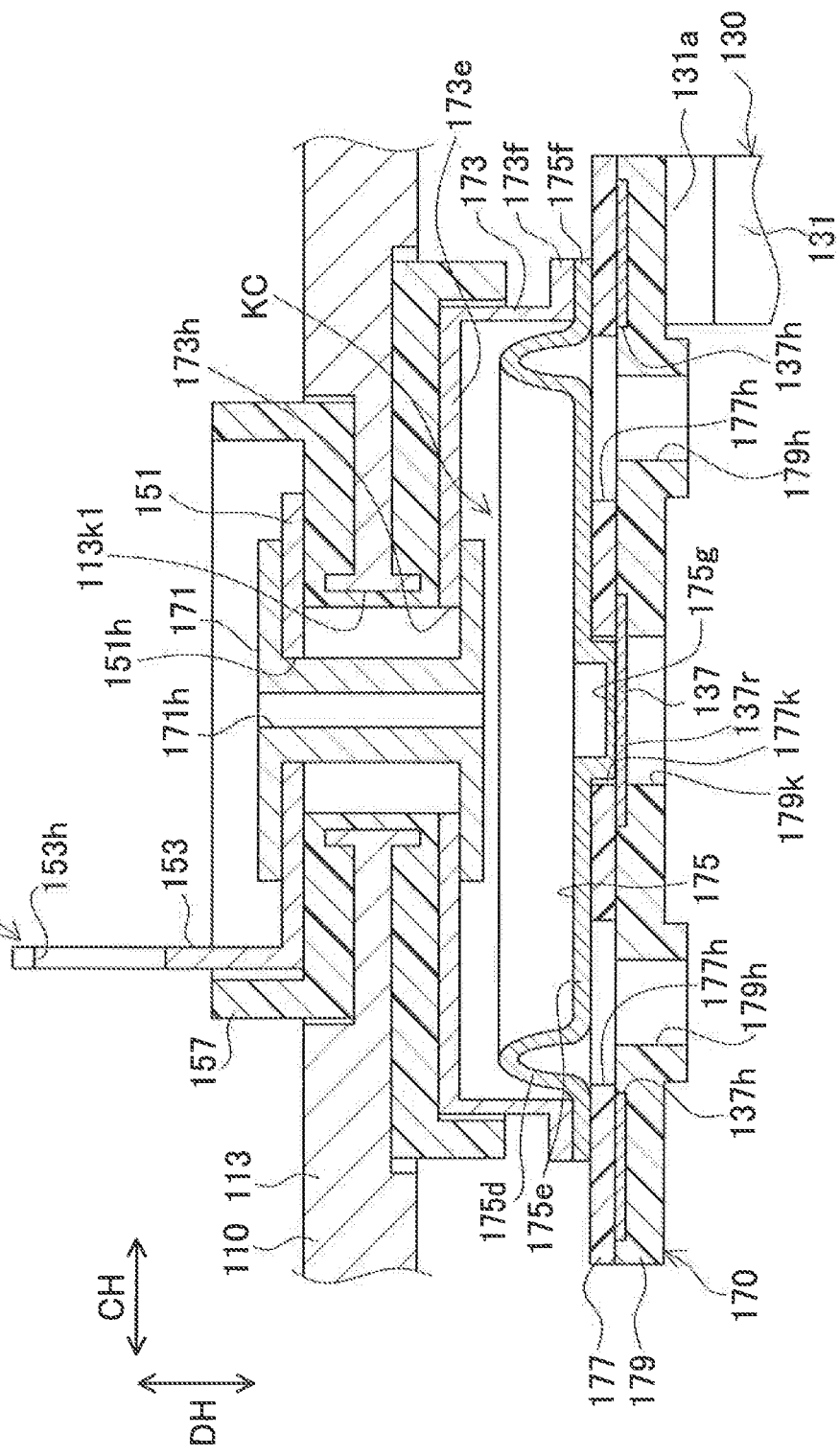
FIG. 5 is a partial enlarged cross sectional view of a pressure-type current interrupt mechanism in the lithium ion secondary battery of the first embodiment.

A detailed description of preferred embodiments of the present invention will now be given referring to the accompanying drawings. FIGS. 1 and 2 show a lithium ion secondary battery 100 (hereinafter, also simply referred to as a battery 100) of a first embodiment. FIG. 3 shows a case bottom wall portion 110b and its surrounding parts in this battery 100. FIG. 4 is an exploded perspective view of an upper part of this battery 100. FIG. 5 shows a pressure-type current interrupt mechanism 170. The following explanation is made assuming that an upper part in FIGS. 1 to 5 corresponds to an upper side of the battery 100 and a lower part corresponds to a lower side of the battery 100, and a direction of the thickness of the battery 100 is indicated by BH, a direction of the width of the same is indicated by CH, and a direction of the height of the same is indicated by DH.

This battery 100 is a rectangular battery to be mounted in a vehicle such as a hybrid car and an electric car or in a battery using device such as a hammer drill. This battery 100 includes a rectangular parallelepiped battery case 110, a flat-shaped wound electrode body 120 set in an accommodating space SC of the battery case 110, a positive terminal (a positive external terminal member) 150 and a negative terminal (a negative external terminal member) 160 each supported in the battery case 110 (see FIGS. 1 and 2).

The positive external terminal member 150 and the electrode body 120 are electrically connected to each other through a pressure-type current interrupt mechanism 170 and a positive internal terminal member (a positive potential member) 130 which will be described later. Further, the negative external terminal member 160 and the electrode body 120 are electrically connected to each other through a negative internal terminal member (a negative potential member) 140 which will be described later. Accordingly, an electrically-conducting path from the positive external terminal member 150 to the negative external terminal member 160 is provided in the battery 100 to allow charge and discharge currents to flow through the battery 100. In the accommodating space SC in the battery case 110, there is also stored a gas-generating liquid (a gas-generating material) 190 which will be mentioned later.

The battery case 110 is made of metal (concretely, aluminum). This battery case 110 has a rectangular parallelepiped shape including a case upper wall portion 110a, a case bottom wall portion 110b parallel to the upper wall portion 110a, and four case side wall portions 110c, 110d, 110e, and 110f connecting the upper wall portion 110a and the bottom wall portion 110b.

The battery case 110 is constituted of a case body member 111 and a case lid member 113 (see FIGS. 1 and 2). The case body member 111 has a box-liked shape having an upper open end and including the aforementioned bottom wall portion 110b and four side wall portions 110c, 110d, 110e, and 110f. The case lid member 113 is of a rectangular plate-like shape formed of the case upper wall portion 110a welded to the case body member 111 to close an opening 111h of the body member 111.

The case lid member 113 is provided, near its center in a longitudinal direction (corresponding to the width direction CH of the battery 100), with a non-return safety valve 113v configured to fracture when an internal pressure Pa of the battery case 110 reaches a predetermined operation pressure Pc. Furthermore, near the safety valve 113v of the case lid member 113, there is provided a liquid inlet 113h to be used for injection of an electrolyte 117 into the battery case 110. This liquid inlet 113h is hermetically sealed with a sealing member 115.

The case lid member 113 is formed with insertion holes 113k1 and 113k2 at predetermined positions near both ends of the case lid member 113 in the longitudinal direction CH. In the one insertion hole 113k1 (a right one in FIG. 2), a caulking member 171 and an insulating member 157 which will be mentioned later are inserted. In the other insertion hole 113k2 (a left one in FIG. 2), a negative caulking part 147 of a negative internal terminal member 140 and an insulating member 167 which will be mentioned later are inserted.

The electrode body 120 will be explained below (see FIG. 2). This electrode body 120 is set in the accommodating space SC of the battery case 110 so that the electrode body 120 is placed sideways with its axis being parallel to the width direction CH of the battery 100. This electrode body 120 is an assembly of a strip-shaped positive electrode sheet 121 and a strip-shaped negative electrode sheet 123 that are wound together by interposing two separators 125, 125 each made of a porous film between the electrode sheets 121 and 123 in layers, and compressed in a flat shape. A part of the positive electrode sheet 121 in the width direction protrudes in a spiral shape on one side (rightward in FIG. 2) in the axial direction (the width direction CH) from the separators 125 and is connected to the positive internal terminal member 130 mentioned later. A part of the negative electrode sheet 123 in the width direction protrudes in a spiral shape on the other side (leftward in FIG. 2) in the axial direction (the width direction CH) from the separators 125 and is connected to the negative internal terminal member 140 mentioned later.

In this electrode body 120, a non-aqueous electrolyte 117 is retained. To be concrete, this electrolyte 117 is an organic electrolyte prepared by dissolving $LiPF_6$ as a solute into a mixed organic solvent made of ethylene carbonate (EC), ethylmethyl carbonate (EMC), and dimethyl carbonate (DMC) so that a mixing ratio by volume is EC:EMC:DMC=3:3:4, and a lithium ion concentration is 1.0 mol/L. In a battery having a conventional pressure-type current interrupt mechanism, the electrolyte contains for example about 2 wt % of a gas-generating additive. The electrolyte 117 in the present embodiment does not contain such a gas-generating additive.

The positive external terminal member (the positive terminal) 150 and the negative external terminal member (the negative terminal) 160 will be explained below (see FIGS. 1, 2, 4, and 5). The positive external terminal member 150 and the negative external terminal member 160 are respectively fixed to the case lid member 113 through the insulating members 157 and 167 each made of resin.

The positive external terminal member 150 is formed of a metal plate made of aluminum and bent in its thickness direction into an L-like shape, including a first conductive portion 151 and a second conductive portion 153. The first conductive portion 151 is a rectangular plate-shaped portion extending in the width direction CH along the case lid member 113. This first conductive portion 151 is formed with an insertion hole 151h in which the caulking member 171 mentioned later is inserted. The caulking member 171 is connected to the first conductive portion 151 by caulking (riveting). The second conductive portion 153 is a rectangular plate-shaped portion extending vertically in the height direction DH from the first conductive portion 151. This second conductive portion 153 is formed with a through hole 153h to allow a connecting terminal such as bus bar and a crimp-type terminal provided outside a battery to be fastened with a bolt and a nut.

The negative external terminal member 160 is made of copper in an L-like shape, similar to the positive external terminal member 150, including a first conductive portion 161 having an insertion hole 161h and a second conductive portion 163 having a through hole 163h. The first conductive portion 161 is connected to the negative caulking part 147 of the negative internal terminal member 140 mentioned later by caulking (riveting).

Figure 6:
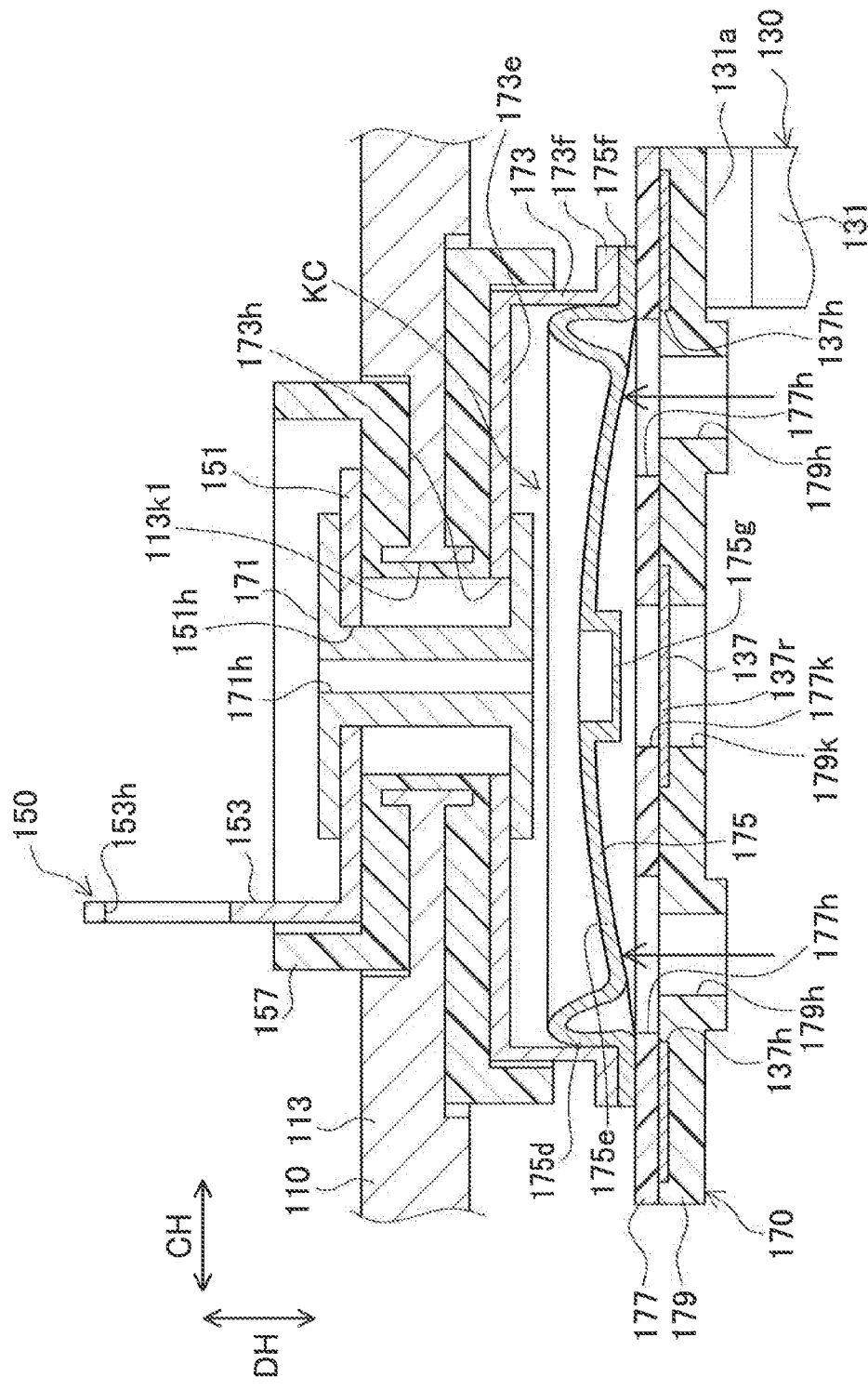
FIG. 6 is an explanatory view showing a state where the pressure-type current interrupt mechanism is operated to interrupt charge and discharge currents in the lithium ion secondary battery of the first embodiment.

The pressure-type current interrupt mechanism (CID) 170 will be explained below (see FIGS. 2, 4, 5, and 6). This mechanism 170 is configured to operate to interrupt charge and discharge currents flowing through the mechanism 170 when the internal pressure Pa of the battery case 110 exceeds a predetermined operation pressure Pb. FIG. 5 shows a pre-operation state (before operation) of the mechanism 170 (ON state), in which charge and discharge currents are allowed to flow and FIG. 6 shows a post-operation state (after operation) of the mechanism 170 (OFF state), in which charge and discharge currents are not allowed to flow.

This pressure-type current interrupt mechanism 170 includes a caulking member 171, a relay member 173, a diaphragm 175, and a terminal side connecting part 137 of the positive internal terminal member 130 mentioned later, each of which is made of aluminum, and a first surrounding member 177 and a second surrounding member 179 each of which is made of resin. The caulking member 171 has a nearly cylindrical shape having a through hole 171h providing communication between inside and outside of the battery case 110. This caulking member 171 extends from inside to outside of the battery case 110 by passing through an insertion hole 173h of the relay member 173, the insertion hole 113k1 of the case lid member 113, the insulating member 157, and an insertion hole 151h of the first conductive portion 151 of the positive external terminal member 150. This caulking member 171 fastens by caulking (riveting) the relay member 173, the first conductive portion 151, and the insulating member 157 to the case lid member 113 and is connected to the relay member 173 inside the battery case 110 and also connected to the first conductive portion 151 outside the battery case 110.

The relay member 173 has a rectangular shape in plan view and includes a rectangular recessed portion 173e recessed toward the case lid member 113 (upward) and an annular peripheral edge portion 173f surrounding the recessed portion 173e. This recessed portion 173e is formed, at its center, with the insertion hole 173h. This relay member 173 is connected by caulking (riveting) to the caulking member 171 inserted in the insertion hole 173h as mentioned above.

The diaphragm 175 is made of a metal plate formed in a rectangular shape in plan view and is placed under the relay member 173. This diaphragm 175 includes a center portion 175e having an oval plate-like shape, an annular peripheral edge portion 175f, and an annular bent portion 175h bent in U shape so as to protrude upward. The center portion 175 is provided at its center with a cylindrical protrusion 175g protruding downward.

The peripheral edge portion 175f of the diaphragm 175 is hermetically joined (welded) to the peripheral edge portion 173f of the relay member 173. Accordingly, a space KC is formed between the caulking member 171, the relay member 173, and the diaphragm 175 (see FIG. 5). This space KC is communicated with the outside of the battery case 110 through the through hole 171h of the caulking member 171 and thus the pressure in the space KG is atmospheric pressure.

The terminal side connecting part 137 of the positive internal terminal member 130 has a rectangular plate-like shape and is placed under the diaphragm 175. This connecting part 137 is formed with two through holes 137h, 137h. Other portions of the positive internal terminal member 130 will be explained later.

This terminal side connecting part 137 is held between and surrounded by the first surrounding member 177 and the second surrounding member 179 each of which is made of resin in a nearly rectangular plate-like shape. The first surrounding member 177 and the second surrounding member 179 are formed respectively with through holes 177h, 177h and 179h, 179h at positions corresponding to the two through holes 137h, 137h of the terminal side connecting part 137. This provides communication between above the first surrounding member 177 and below the second surrounding member 179 to allow the internal pressure Pa of the battery case 110 to act on the diaphragm 175 from below (see FIG. 5).

The first surrounding member 177 and the second surrounding member 179 are respectively formed at their centers with through holes 177k and 179k. Accordingly, the center portion of the terminal side connecting part 137 is a circular exposed portion 137r exposed to above the first surrounding member 177 and below the second surrounding member 179. This exposed portion 137r is in contact with, hence in electrically connected with, the protrusion 175g of the diaphragm 175 inserted in the through hole 177k of the first surrounding member 177.

The pressure-type current interrupt mechanism 170 is configured such that the center portion 175e of the diaphragm 175 is pressed upward and deformed to heave up when the internal pressure Pa of the battery case 110 rises over the predetermined operation pressure Pb (concretely, 1.0 MPa). Along with this, the protrusion 175g of the diaphragm 175 moves upward, separating from the exposed portion 137r of the terminal side connecting part 137 (see FIG. 6). This cuts off the electrically-conducting path in the mechanism 170, thereby interrupting the charge and discharge currents flowing through the mechanism 170.

Next, the positive internal terminal member 130 will be explained (see FIGS. 2 to 5). In the first embodiment, this terminal member 130 is also used as the positive potential member. The positive internal terminal member (the positive potential member) 130 electrically connects between the pressure-type current interrupt mechanism 170 and the positive electrode (the positive electrode sheet 121) of the electrode body 120. This terminal member 130 is made of aluminum and includes a positive main part 131 and a positive contact part 133 in addition to the aforementioned rectangular plate-shaped terminal side connecting part 137.

The positive main part 131 has a plate-like shape extending in the height direction DH of the battery 100. One end 131a (an upper one in FIG. 2) of the main part 131 is continuous to the terminal side connecting part 137 and the other end 131b (a lower one in FIG. 2) is continuous to the positive contact part 133. The positive main part 131 includes a middle portion 131c located at the center in the longitudinal direction (the height direction DH) which is connected (welded) to the positive electrode sheet 121 of the electrode body 120.

The positive contact part 133 has a plate-like shape extending over a long distance in parallel to the case bottom wall portion 110b in the width direction CH (the longitudinal direction of the case bottom wall portion 110b) of the battery 100 and includes a positive main surface 133c and a positive back surface 133d parallel thereto (see FIGS. 2 and 3). One end 133a (a left one in FIG. 2) of the positive contact part 133 is continuous to the other end 131b of the positive main part 131 as described above. On the other hand, the other end 133b (a right one in FIG. 2) of the positive contact part 133 is located near a negative main part 141 of the negative internal terminal member 140 mentioned later. This positive contact part 133 is immersed in the gas-generating liquid 190 mentioned later so that the main surface 133c faces to the case upper wall portion 110a (upward in FIGS. 2 and 3) and the back surface 133d faces to the case bottom wall portion 110b (downward in FIGS. 2 and 3).

The negative internal terminal member 140 will be explained below (see FIGS. 2 to 4). In the first embodiment, this terminal member 140 is also used as the aforementioned negative potential member. The negative internal terminal member (the negative potential member) 140 electrically connects between the negative external terminal member 160 and the negative electrode (the negative electrode sheet 123) of the electrode body 120. The negative internal terminal member 140 is made of copper including the negative caulking part 147, the negative main part 141 and the negative contact part 143.

The negative caulking part 147 extends from inside to outside of the battery case 110 by passing through the insertion hole 113k2 of the case lid member 113, the insulating member 167, and the insertion hole 161h of the first conductive portion 161 of the negative external terminal member 160. The negative caulking part 147 fastens by caulking (riveting) the first conductive portion 161 and the insulating member 167 to the case lid member 113 and is continuous to the negative main part 141 mentioned later inside the battery case 110 and also connected to the first conductive portion 161 outside the battery case 110.

The negative main part 141 has a plate-like shape extending obliquely downward from the negative caulking part 147 and then downward (in the height direction DH of the battery 100). One end 141a (an upper one in FIG. 2) of the negative main part 141 is continuous to the negative caulking part 147 and the other end 141b (a lower one in FIG. 2) is continuous to the negative contact part 143 as mentioned above. Further, the negative main part 141 includes a middle portion 141c located at the center in the longitudinal direction (the height direction DH) which is connected (welded) to the negative electrode sheet 123 of the electrode body 120.

The negative contact part 143 has a plate-like shape extending over a long distance in parallel to the case bottom wall portion 110b in the width direction CH (the longitudinal direction of the case bottom wall portion 110b) of the battery 100 and includes a negative main surface 143c and a negative back surface 143d parallel thereto (see FIGS. 2 and 3). One end 143a (a left one in FIG. 2) of the negative contact part 143 is continuous to the other end 141b of the negative main part 141 as described above. On the other hand, the other end 143h (a right one in FIG. 2) of the negative contact part 143 is located near the positive main part 131 of the positive internal terminal member 130.

The negative contact part 143 is immersed in the gas-generating liquid 190 mentioned later so that the main surface 143c faces to the case bottom wall portion 110b (downward in FIGS. 2 and 3) and the back surface 143d faces to the case upper wall portion 110a (upward in FIGS. 2 and 3). Further, the main surface 143c of the negative contact part 143 and the main surface 133c of the positive contact part 133 face in parallel to each other by interposing therebetween a porous film 191 having the same insulation property as the separators 125 forming the electrode body 120.

Next, the gas-generating liquid (the gas-generating material) 190 will be explained (see FIGS. 2 and 3). This gas-generating liquid 190 is stored in bottom area SCB of the accommodating space SC in the battery case 110. This gas-generating liquid is a liquid prepared by adding cyclohexyl benzene (CHB) as a gas-generating agent to a mixed organic solvent made of EC, EMC, and DMC as with the electrolyte 117. The concentration of the gas-generating agent in the first embodiment is 6.0 wt %. When a potential of the positive contact part 133 of the positive internal terminal member (the positive potential member) 130 immersed in the gas-generating liquid 190 (i.e., a positive potential of the electrode body 120) exceeds 4.70 V vs. $Li/Li^+$, the gas-generating agent reacts and generates a gas (concretely, hydrogen gas). It is to be noted that the gas-generating agent may be selected from biphenyl (BP) and methylphenyl carbonate (MPhc), for example, instead of the aforementioned CHB.

The gas generation from the gas-generating liquid 190 results from the following reaction. That is, when the positive potential Ea exceeds a gas-generating potential Ec, the gas-generating agent, CHB, is oxidatively decomposed at the positive contact part 133 and thus generates protons. The protons move in the gas-generating liquid 190, receive electrons from the negative contact part 143 to reduce to hydrogen gas. This hydrogen gas is evolved from the gas-generating liquid 190. Since gas is generated in the above way, as the positive contact part 133 and the negative contact part 143 face each other by respective wider areas through the gas-generating liquid 190, a larger amount of gas can be produced from the gas-generating liquid 190.

As explained above, in this battery 100, the gas-generating liquid 190 is positioned outside the electrode body 120 within the battery case 110, and the positive internal terminal member (the positive potential member) 130 to which the positive potential Ea of the electrode body 120 will be applied and the negative internal terminal member (the negative potential member) 140 to which the negative potential Ed of the electrode body 120 will be applied are spaced apart from each other and in contact with the gas-generating liquid 190. The gas-generating liquid 190 contains CHB which is the gas-generating agent generates gas when the potential of the positive internal terminal member 130 (the positive potential of the electrode body 120) exceeds the gas-generating potential Ec (concretely, 4.70 V vs. Li/Li$^+$) higher than the potential Eb (4.15 V vs. Li/Li$^+$) for full charge (SOC 100%).

Thus, a terminal voltage of the battery 100 increases over 4.10 V (at that time, the positive potential Eb is 4.15 V vs. Li/Li$^+$) corresponding to a full charge voltage and goes into an overcharge state. When the positive potential (the potential of the positive internal terminal member 130) Ea further exceeds the gas-generating potential Ec (concretely, 4.70 V vs. Li/Li$^+$), gas is generated from the gas-generating liquid 190 placed outside the electrode body 120. Since this gas is generated outside the electrode body 120 and thus is not retained in the electrode body 120, the gas surely increases the internal pressure Pa of the battery case 110. Consequently, when the battery 100 enters an overcharge state and the positive potential Ea exceeds the gas-generating potential Ec, the pressure-type current interrupt mechanism 170 can be reliably operated.

In the first embodiment, furthermore, the gas-generating material 190 is the gas-generating liquid stored in the bottom area SCB of the accommodating space SC in the battery case 110. The contact part 133 of the positive internal terminal member 130 and the contact part 143 of the negative internal terminal member 140 are arranged in the bottom area SCB of the accommodating space SC and immersed in the gas-generating liquid 190. This configuration can facilitate placement of the gas-generating liquid 190, the positive internal terminal member 130, and the negative internal terminal member 140 in the accommodating space SC in the battery case 110.

In the first embodiment, furthermore, the electrode body 120 and the gas-generating liquid 190 are spaced apart from each other. In case the electrode body 120 is in contact with the gas-generating liquid 190, a part of the gas-generating liquid 190 may enter the electrolyte 117 retained in the electrode body 120. The present embodiment can reliably prevent such a mixture. Thus, the gas-generating liquid 190 can be made of an especially suitable composition for gas generation separately from the composition of the electrolyte 117 retained in the electrode body 120.

In the first embodiment, the bottom wall portion 110$b$ of the battery case 110 has a rectangular plate-like shape. The positive contact part 133 includes the positive main surface 133$c$ extending over a long distance in the longitudinal direction CH of the bottom wall portion 110$b$. The negative contact part 143 includes the negative main surface 143$c$ extending over a long distance in the longitudinal direction CH of the bottom wall portion 110$b$. The positive main surface 133$c$ and the negative main surface 143$c$ are placed in parallel to each other and face each other by interposing therebetween the gas-generating liquid 190. Since the positive main surface 133$c$ and the negative main surface 143$c$ are placed facing each over a long distance, the gas-generating agent easily reacts with the positive contact part 133 in the gas-generating liquid 190 when the positive potential Ea exceeds the gas-generating potential Ec and this can reliably generate a larger amount of gas from the gas-generating liquid 190.

In the conventional battery, as described above, the gas-generating agent is added to the electrolyte and thus battery characteristics such as cycle characteristics, temperature characteristics, and storage characteristics may be affected depending on the kinds and the concentrations of gas-generating agent. In the battery 100 of the first embodiment, to address such disadvantages, the electrolyte 117 is prepared in a composition that does not contain a gas-generating additive such as the gas-generating agent contained in the gas-generating liquid 190. This can prevent the battery characteristics from being adversely influenced by addition of the gas-generating additive to the electrolyte 117. In the first embodiment, furthermore, the positive potential member 130 is also used as the positive internal terminal member and the negative potential member 140 is also used as the negative internal terminal member, so that the battery 100 can be easily produced with a reduced number of components and at low costs.

Next, a method of producing the battery 100 will be explained. The positive internal terminal member 130, the first surrounding member 177, and the second surrounding member 179 are first prepared. The terminal side connecting part 137 of the terminal member 130 is held between the first and second surrounding members 177 and 179 and they are bonded and fixed to each other (see FIGS. 4 and 5). In a separate process, the positive external terminal member 150, the case lid member 113, the insulating member 157, and the relay member 173 are prepared. The terminal member 150, the insulating member 157, and the relay member 173 are fixed by caulking (riveting) to the case lid member 113 with the rivet 171B (see FIGS. 4 and 5). Accordingly, the rivet 171B is transformed to the caulking member 171. Thereafter, the diaphragm 175 is prepared, the peripheral portion 175$f$ is overlaid on the peripheral portion 173$f$ of the relay member 173, and then they are welded to each other.

Successively, the positive main part 131 of the positive internal terminal member 130 and the positive electrode sheet 121 of the electrode body 120 separately produced are welded to each other. Further, the negative internal terminal member 140 having not been subjected yet to caulking (riveting) (see FIG. 4) is prepared, and then the negative main part 141 is welded to the negative electrode sheet 123 of the electrode body 120. The porous film 191 is interposed between the main surface 133$c$ of the positive contact part 133 of the positive internal terminal member 130 and the main surface 143$c$ of the negative contact part 143 of the negative internal terminal member 140.

On the positive electrode side, the first surrounding member 177 and the peripheral portion 175$f$ of the diaphragm 175 are bonded so that the exposed portion 137$r$ of the terminal side connecting part 137 of the positive internal terminal member 130 and the protrusion 175$g$ of the diaphragm 175 are in contact with each other (see FIGS. 4 and 5). On the negative electrode side, the negative external terminal member 160 and the insulating member 167 are prepared. These terminal member 160 and insulating member 167 are fixed by caulking (riveting) of a rivet portion 147B of the negative internal terminal member 140 to the case lid member 113 (see FIGS. 4 and 2). Thus, the rivet portion 147B is transformed into the negative caulking part 147.

Successively, the case body member 111 is prepared. The electrode body 120 is set in this case body member 111 and then the opening 111$h$ of the case body member 111 is closed by the case lid member 113. The case body member 111 and the case lid member 113 are welded to each other by laser welding (see FIG. 2).

This battery 100 is put in a vacuum chamber and then the vacuum chamber is decompressed. A liquid supply nozzle is inserted in the liquid inlet 113$h$ and the electrolyte 117 is supplied to the electrode body 120 in the battery case 110 through the liquid supply nozzle. At this time, the battery 100 is preferably oriented sideways so that the width direction CH of the battery 100 is aligned with an up-down (vertical) direction, so that the electrolyte 117 is reliably poured into the electrode body 120. Thereafter, the vacuum chamber is returned to atmospheric pressure. The battery 100 is taken out of the vacuum chamber.

Under atmospheric pressure, subsequently, the battery 100 is placed in an orientation so that the height direction DH is aligned with the up-down direction. The liquid supply nozzle is inserted in the liquid inlet 113h and the gas-generating liquid 190 is poured into the battery case 110 through the liquid supply nozzle. This gas-generating liquid 190 is stored in the bottom area SCB of the accommodating space SC in the battery case 110 and thus the gas-generating liquid 190 is separated apart from the electrode body 120. Accordingly, the positive contact part 133 of the positive internal terminal member 130 and the negative contact part 143 of the negative internal terminal member 140 facing each other through the porous film 191 are immersed in the gas-generating liquid 190. Since the gas-generating liquid 190 is impregnated in the porous film 191, the positive contact part 133 and the negative contact part 143 are made to face each other through the gas-generating liquid 190.

Then, the sealing member 115 is prepared and placed to hermetically seal the liquid inlet 113h. The battery 100 is subjected to initial charge and further to aging. Thus, the battery 100 is completed.

Second Embodiment

A second embodiment will be explained. A lithium ion secondary battery ("battery") 200 of the second embodiment includes a positive internal terminal member (a positive potential member) 230 and a negative internal terminal member (a negative potential member) 240 (see FIG. 7) different in configuration from the positive internal terminal member (the positive potential member) 130 and the negative internal terminal member (the negative potential member) 140 of the second embodiment. Accordingly, an electrode body 220 is also slightly different in configuration from the electrode body 120 of the first embodiment. Other components or parts in the second embodiment are similar to those in the first embodiment and will be omitted or simplified in the following explanation.

The positive internal terminal member 230 of the second embodiment electrically connects between the pressure-type current interrupt mechanism 170 and the positive electrode (a positive electrode sheet 221) of the electrode body 220 and is also used as the positive potential member, as with the positive internal terminal member 130 of the first embodiment. However, this positive internal terminal member 230 includes a terminal side connecting part 237, a positive extended part 231, a positive contact part 233, and a positive connecting part 235. The terminal side connecting part 237 is similar to the terminal side connecting part 137 of the first embodiment.

The positive extended part 231 has a plate-like shape extending in the height direction DH of the battery 100. One end 231a (an upper one in FIG. 7) of this extended part 231 is continuous to the terminal side connecting part 237 and the other end 231b (a lower one in FIG. 7) is continuous to the positive contact part 233. Thus, the positive extended part 231 is not directly connected to the positive electrode sheet 221 of the electrode body 220.

Figure 7:
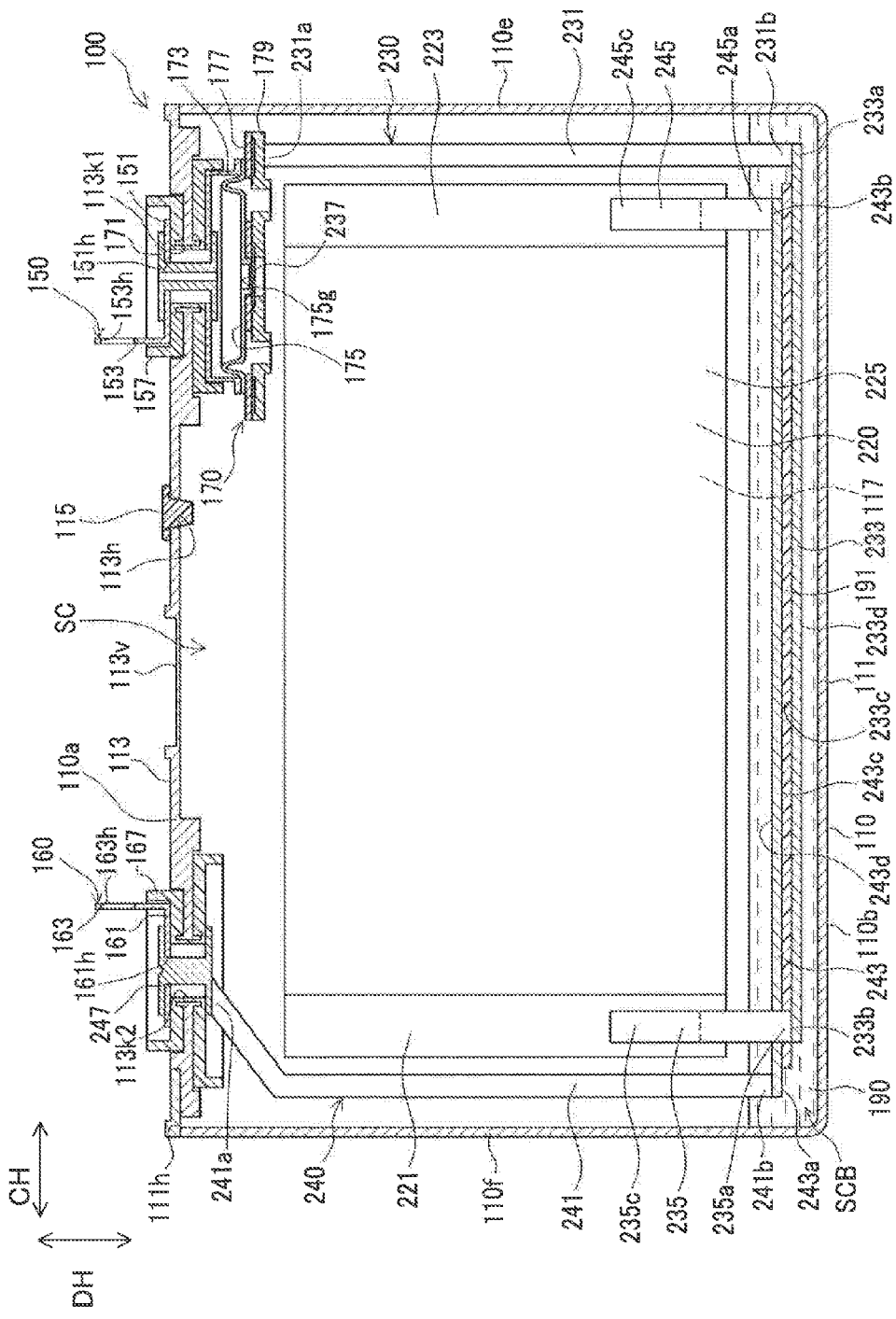
FIG. 7 is a vertical cross sectional view of a lithium ion secondary battery of a second embodiment.

As with the positive contact part 133 of the first embodiment, the positive contact part 233 has a plate-like shape having a positive main surface 233c and a positive back surface 233d parallel thereto and extending in parallel to the bottom wall portion 110b in the width direction CH of the battery 100 (in the longitudinal direction of the case bottom wall portion 110b) (see FIGS. 7 and 3). This positive contact part 233 is immersed in the gas-generating liquid 190 as in the first embodiment. One end 233a (a right one in FIG. 7) of the contact part 233 is continuous to the other end 231b of the positive extended part 231 as described above and the other end 233b (a left one in FIG. 7) is continuous to the positive connecting part 235.

The positive connecting part 235 has a plate-like shape extending in the height direction DH of the battery 100. One end 235a (a lower one in FIG. 7) of this connecting part 235 is continuous to the other end 233b of the positive contact part 233 as described above. On the other hand, the other end side portion 235c (an upper one in FIG. 7) of the connecting part 235 is connected (welded) to the positive electrode sheet 221 of the electrode body 220. As above, the positive internal terminal member 230 of the second embodiment is configured such that the positive contact part 233 immersed in the gas-generating liquid 190 connects between the positive external terminal member 150 and the positive extended part 231 continuous to the pressure-type current interrupt mechanism 170 with the positive connecting part 235 connected to the positive electrode sheet 221 of the electrode body 220. Accordingly, charge and discharge currents flow in the positive contact part 233.

The electrode body 220 of the second embodiment is designed with a smaller size in an axial direction (the width direction CH of the battery) than the electrode body 120 of the first embodiment. This electrode body 220 is accommodated in the accommodating space SC of the battery case 110 so that the positive electrode sheet 221 protruding from the separators 225 is located on a side corresponding to the negative external terminal member 160 (on a left side in FIG. 7) and the negative electrode sheet 223 protruding from the separators 225 is located on a side corresponding to the positive external terminal member 150 (a right side in FIG. 7), which is a left-right reversed orientation of the electrode body 120 of the first embodiment.

Next, the negative internal terminal member 240 will be explained. As with the negative internal terminal member 140 of the first embodiment, this terminal member 240 electrically connects between the negative external terminal member 160 and the negative electrode sheet 223 of the electrode body 220 and is also used as the negative potential member. However, this terminal member 240 includes a negative caulking part 247, a negative extended part 241, a negative contact part 243, and a negative connecting part 245. The negative caulking part 247 is similar to the negative caulking part 147 of the first embodiment.

The negative extended part 241 has a plate-like shape extending obliquely downward and then downward (the height direction DH of the battery 100). One end 241a (an upper one in FIG. 7) of this negative extended part 241 is continuous to the negative caulking part 247 and the other end 241b (a lower one in FIG. 7) is continuous to the negative contact part 243. Accordingly, this negative extended part 241 is not directly connected to the negative electrode sheet 223 of the electrode body 220.

As with the negative contact part 143 of the first embodiment, the negative contact part 243 has a plate-like shape including a negative main surface 243c and a negative back surface 243d parallel thereto and extending in parallel to the case bottom wall portion 110b in the width direction CH of the battery 100 (in the longitudinal direction of the case bottom wall portion 110b) (see FIGS. 7 and 3). This negative contact part 243 is immersed in the gas-generating liquid 190 in an orientation facing the positive contact part 233 in a similar manner to in the first embodiment. One end 243a (a left one in FIG. 7) of the negative contact part 243 is continuous to the other end 241b of the negative extended part 241 as described above, and the other end 243b (a right one in FIG. 2) is continuous to the negative connecting part 245.

The negative connecting part 245 has a plate-like shape extending in the height direction DH of the battery 100. One end 245a (a lower one in FIG. 7) of this connecting part 245 is continuous to the other end 243b of the negative contact part 243 as described above. On the other hand, the other end side portion 245c (an upper one in FIG. 7) of the negative connecting part 245 is connected (welded) to the negative electrode sheet 223 of the electrode body 220. As above, the negative internal terminal member 240 of the second embodiment is configured such that the negative contact part 243 immersed in the gas-generating liquid 190 connects between the negative extended part 241 continuous to the negative caulking part 247 connected to the negative external terminal member 160 and the negative connecting part 245 connected to the negative electrode sheet 223 of the electrode body 220. Accordingly, charge and discharge currents flow in the negative contact part 243.

As explained above, the battery 200 of the second embodiment also includes the gas-generating liquid 190 similar to that in the first embodiment, in which the positive internal terminal member (the positive potential member) 230 and the negative internal terminal member (the negative potential member) 240 are separated from each other and in contact with the gas-generating liquid 190. Thus, when the battery 100 enters an overcharge state and further the positive potential (the potential of the positive internal terminal member 230) exceeds the gas generating potential Ec, the gas-generating liquid 190 generates gas, thereby reliably increasing the internal pressure Pa of the battery case 110. This can surely operate the pressure-type current interrupt mechanism 170. Furthermore, similar or identical parts to those in the first embodiment provide the same operations and effects.

Third Embodiment

Figure 8:
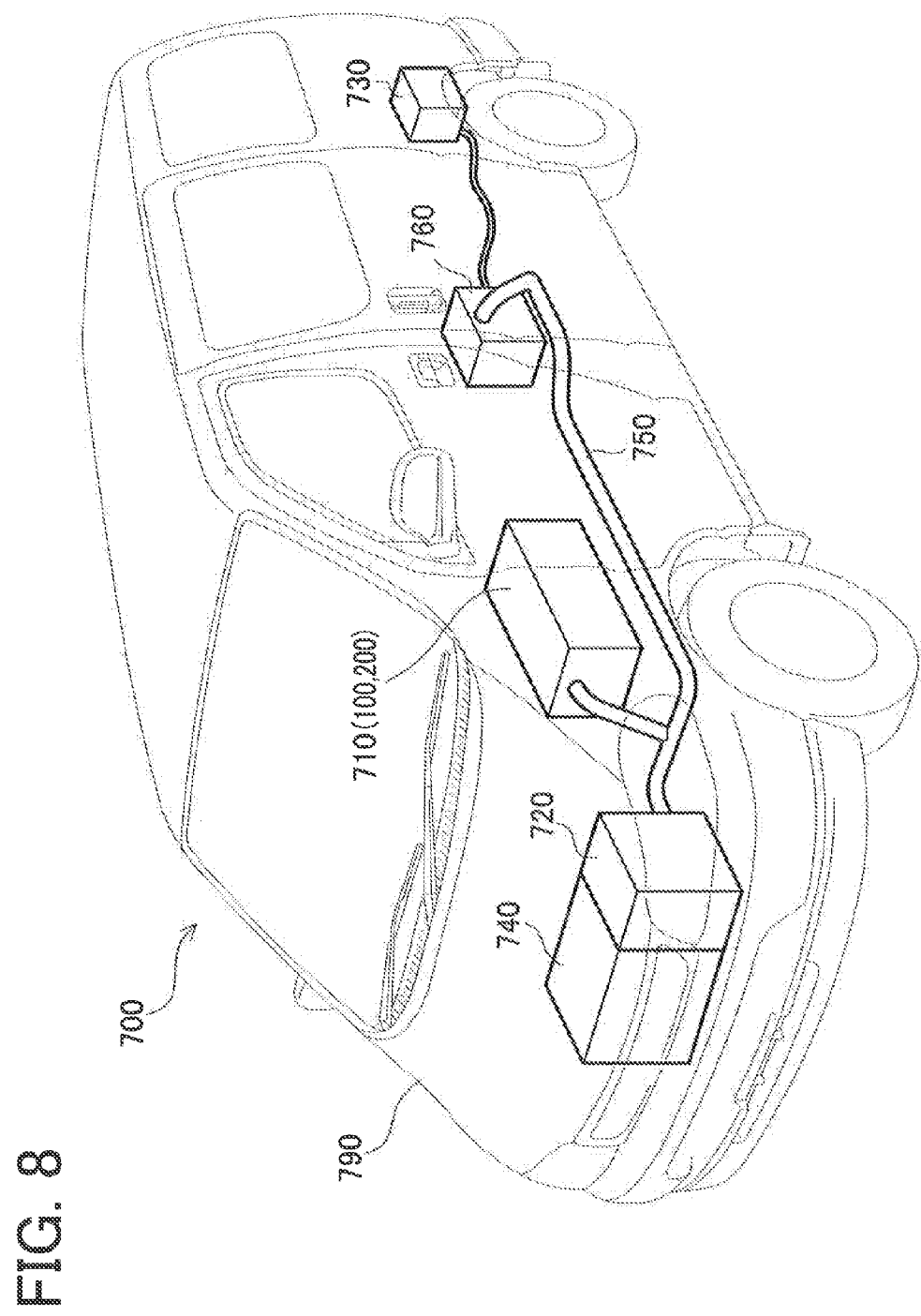
FIG. 8 is an explanatory view showing a hybrid car of a third embodiment.

A third embodiment will be explained below. A hybrid car (a vehicle) 700 (hereinafter, also simply referred to as a car 700) of the third embodiment mounts therein the battery 100 of the first embodiment and uses electrical energy stored in this battery 100 for part or all of a power source (see FIG. 8).

This car 700 is a hybrid ear that mounts an assembled battery 710 constituting of a plurality of batteries 100 and is to be driven using a combination of an engine 740, a front motor 720, and a rear motor 730. This car 700 includes a vehicle body 790 and the engine 740, and the front motor 720, the rear motor 730, the assembled battery 710 (the batteries 100), a cable 750, and an inverter 760. This car 700 is configured to drive the front motor 720 and the rear motor 730 by using electrical energy stored in the assembled battery 710 (the batteries 100). As explained above, the pressure-type current interrupt mechanism 170 of each battery 100 can be reliably operated when the battery or the batteries 100 enter an overcharge state and further the positive potential Ea exceeds the predetermined gas-generating potential Ec. The batteries 100 can provide especially high safety of the car 700. Instead of the battery 100 of the first embodiment, the battery 200 of the second embodiment may be mounted in the car 700.

Fourth Embodiment

Figure 9:
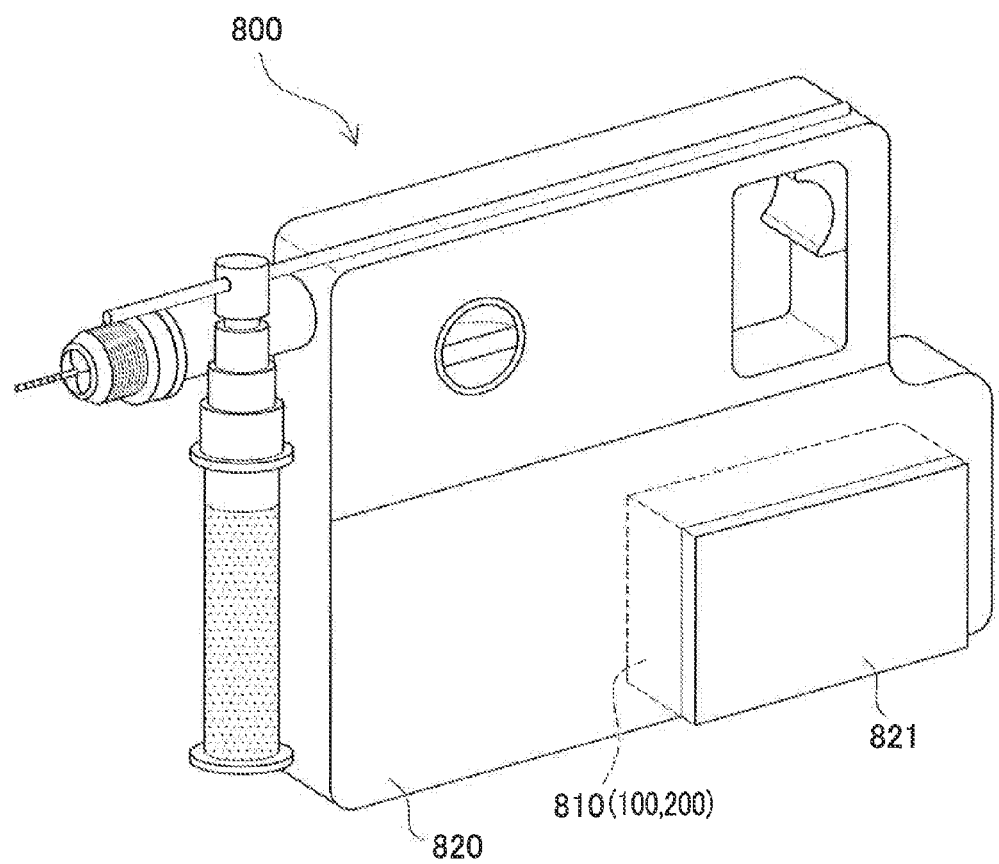
FIG. 9 is an explanatory view showing a hammer drill of a fourth embodiment.

A fourth embodiment will be explained below. A hammer drill 800 of the fourth embodiment is a battery-mounted device that mounts the battery 100 of the first embodiment (see FIG. 9). This hammer drill 800 houses a battery pack 810 including the battery 100 and uses this battery pack 810 for an energy source to drive a drill. As explained above, the pressure-type current interrupt mechanism 170 of each battery 100 can be reliably operated when the battery 100 goes into an overcharge state and further the positive potential Ea exceeds the predetermined gas-generating potential Ec. This battery 100 can provide especially high safety of the hammer drill 800. Instead of the battery 100 of the first embodiment, the battery 200 of the second embodiment may be mounted in the hammer drill 800.

The present invention is explained in the above first to fourth embodiments but not limited thereto. The present invention may be embodied in other specific forms without departing from the essential characteristics thereof.

The first and second embodiments, for instance, exemplify the batteries 100 and 200 each provided with the pressure-type current interrupt mechanism 170 placed in the electrically conducting path on the positive electrode side. In addition to or instead of this current interrupt mechanism 170, a pressure-type current interrupt mechanism may be provided in an electrically conducting path on a negative electrode side. Even in such a configuration, when the battery enters an overcharge state and further the positive potential Ea exceeds the gas-generating potential Ec, the pressure-type current interrupt mechanism is operated to interrupt the charge and discharge currents flowing through the conducting path in the battery 100 extending from the positive external terminal member 150 to the negative external terminal member 160.

The first and second embodiments show the liquid gas-generating material 190 as the "gas-generating material". However, the configuration of the gas-generating material is not limited thereto. The gas-generating material may be provided in any form of solid, gel, sponge impregnated with the liquid, etc. In the first and second embodiments, the gas-generating material 190 is placed in the bottom area SCB of the accommodating space SC of the battery case 110, but the placement of the gas-generating material is not limited thereto. For instance, it may be arranged such that an accommodating part for storing a gas-generating material is additionally provided in an upper or side area of the accommodating space SC of the battery case 110 and the gas-generating material is placed in this accommodating part.

The first and second embodiments show the configuration also used as the positive internal terminal member 130 or 230 as the "positive potential member" and show the configuration also used as the negative internal terminal member 140 or 240 as the "negative potential member". The potential members are not limited to those configurations. For example, it may be arranged such that the positive potential member (the negative potential member) is provided as a separate member independent from the positive internal terminal member (the negative internal terminal member) and is directly connected to the positive (negative)

electrode of the electrode body without being connected to the positive internal terminal member (the negative internal terminal member).

The first and second embodiments exemplify the batteries 100 and 200 in each of which the insulating porous film 191 is interposed between the positive contact part 133 or 233 and the negative contact part 143 or 243. However, the invention is not limited thereto. As an alternative, for instance, the positive contact part 133 or 233 and the negative contact part 143 or 243 are spaced apart to face each other without interposing the porous film 191. In this case, an insulating spacer or the like, made of resin or ceramic, is preferably used to place the positive contact part 133 or 233 and the negative contact part 143 or 243 in reliably spaced positions.

In the first and second embodiments, the electrolyte 117 retained in the electrode body 120 has a composition not containing a gas-generating additive. The invention is not limited thereto. For instance, the same gas-generating agent as the gas-generating agent contained in the gas-generating liquid 190 may be added to the electrolyte 117 at a lower concentration than in the gas-generating liquid 190. Further, a gas-generating additive less affecting the battery characteristics than the gas-generating agent contained in the gas-generating liquid 190 may be added to the electrolyte 117.

The first and second embodiments exemplify the rectangular parallelepiped battery case 110, but the battery case configuration is not limited to this configuration. The battery case may be of a cylindrical shape, for example. In the first and second embodiments, the "electrode body" is exemplified by the wound electrode body 120, 220 configured such that the positive electrode sheet 121, 221 and the negative electrode sheet 123, 223 each having a strip shape are overlapped and wound by interposing the separators 125, 225. However, the configuration of the electrode body is not limited to this. For instance, the electrode body may be a lamination type configured such that a plurality of positive electrode sheets and a plurality of negative electrode sheets, each of which has a predetermined shape (e.g., a rectangular shape), are alternately stacked by interposing separators therebetween.

The third embodiment exemplifies the hybrid car 700 as a vehicle that mounts the battery 100, 200 according to the invention, but the vehicle is not limited to the car 700. The vehicle may be electric cars, plug-in hybrid cars, hybrid railway vehicles, fork lifts, electric wheelchairs, electric bicycles, electric scooters, etc. The fourth embodiment exemplifies the hammer drill 800 as the battery-using device that mounts the battery 100, 200 according to the invention. However, the battery-using device is not limited to the hammer drill 800. The battery-using device may be various battery-powered domestic and office appliances and industrial equipment, such as personal computers mobile phones, battery-powered electric tools, uninterruptible power supplies.

The invention claimed is:

1. A battery provided with a pressure-type current interrupt mechanism placed in an electrically conducting path in which charge and discharge currents will flow, the current interrupt mechanism being configured to interrupt the charge and discharge currents flowing through the current interrupt mechanism according to an increase in internal pressure of a battery case, the battery including:
   a gas-generating material placed outside an electrode body within the battery case;
   a positive potential member placed outside the electrode body within the battery case and in contact with the gas-generating material, the positive potential member being electrically conducted to a positive electrode of the electrode body; and
   a negative potential member placed outside the electrode body within the battery case and in contact with the gas-generating material and spaced apart from the positive potential member, the negative potential member being electrically conducted to a negative electrode of the electrode body,
   the gas-generating material containing a gas-generating agent which will generate gas when a potential of the positive potential member exceeds a gas-generating potential, wherein
   the gas-generating material is a gas-generating liquid stored in a bottom area of accommodating space in the battery case,
   the positive potential member includes a positive contact part placed in the bottom area of the accommodating space and immersed in the gas-generating liquid,
   the negative potential member includes a negative contact part placed in the bottom area of the accommodating space and immersed in the gas-generating liquid and
   the electrode body and the gas-generating liquid are spaced apart from each other.

2. The battery according to claim 1, wherein the gas-generating agent has the gas-generating potential higher than a potential of the positive potential member when the battery is in full charge.

3. The battery according to claim 1, wherein
   the battery case has a rectangular parallelepiped shape including a case bottom wall portion having a rectangular plate-like shape,
   the positive contact part includes a positive main surface which is a main surface extending in a longitudinal direction of the case bottom wall portion,
   the negative contact part includes a negative main surface which is a main surface extending in the longitudinal direction of the case bottom wall portion, and
   the positive main surface and the negative main surface are placed in parallel to and facing each other through the gas-generating liquid.

4. The battery according to claim 1, wherein an electrolyte retained in the electrode body has a composition that contains no gas-generating additive.

5. The battery according to claim 1, wherein
   the positive potential member is connected to the positive electrode of the electrode body and also used as a positive internal terminal member in which the charge and discharge currents flow, and
   the negative potential member is connected to the negative electrode of the electrode body and also used as a negative internal terminal member in which the charge and discharge currents flow.

6. The battery according to claim 2, wherein
   the battery case has a rectangular parallelepiped shape including a case bottom wall portion having a rectangular plate-like shape,
   the positive contact part includes a positive main surface which is a main surface extending in a longitudinal direction of the case bottom wall portion,
   the negative contact part includes a negative main surface which is a main surface extending in the longitudinal direction of the case bottom wall portion, and the positive main surface and the negative main surface are placed in parallel to and facing each other through the gas-generating liquid.

7. The battery according to claim 2, wherein an electrolyte retained in the electrode body has a composition that contains no gas-generating additive.

8. The battery according to claim 3, wherein an electrolyte retained in the electrode body has a composition that contains no gas-generating additive.

9. The battery according to claim 6, wherein an electrolyte retained in the electrode body has a composition that contains no gas-generating additive.

* * * * *